US008718253B2

(12) United States Patent
Sharland et al.

(10) Patent No.: US 8,718,253 B2
(45) Date of Patent: May 6, 2014

(54) AUTOMATIC VOICE CONFERENCE ACTIONS DRIVEN BY POTENTIAL CONFEREE PRESENCE

(75) Inventors: Michael Sharland, Santa Clara, CA (US); Jacqueline Levy, Sunnyvale, CA (US); Jay Maskell, Morgan Hill, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 509 days.

(21) Appl. No.: 11/345,870

(22) Filed: Feb. 1, 2006

(65) Prior Publication Data

US 2007/0189487 A1    Aug. 16, 2007

(51) Int. Cl.
*H04M 3/42* (2006.01)

(52) U.S. Cl.
USPC ............... 379/202.01; 379/202.02; 379/158

(58) Field of Classification Search
USPC ............. 379/201.01, 202.02, 202.01, 205.01, 379/158, 93.21; 370/260, 261, 262
See application file for complete search history.

(56) References Cited

U.S. PATENT DOCUMENTS

| 6,091,947 | A | 7/2000 | Sumner |
| 6,125,176 | A | 9/2000 | Foladare et al. |
| 6,658,095 | B1 | 12/2003 | Yoakum et al. |
| 6,687,358 | B1* | 2/2004 | Mark et al. ............... 379/202.01 |
| 6,757,722 | B2 | 6/2004 | Loonfors et al. |
| 6,965,666 | B1 | 11/2005 | Zhang |
| 6,970,547 | B2 | 11/2005 | Andrews et al. |
| 7,123,695 | B2 | 10/2006 | Malik |
| 7,184,524 | B2* | 2/2007 | Digate et al. ............... 379/88.17 |
| 7,373,410 | B2* | 5/2008 | Monza et al. ................. 709/229 |
| 8,194,837 | B1* | 6/2012 | Weinman ................. 379/201.01 |
| 2002/0076025 | A1* | 6/2002 | Liversidge et al. ...... 379/202.01 |
| 2002/0085701 | A1 | 7/2002 | Parsons et al. |
| 2003/0174814 | A1 | 9/2003 | Diacakis |
| 2004/0059781 | A1 | 3/2004 | Yoakum et al. |
| 2004/0062383 | A1 | 4/2004 | Sylvain |

(Continued)

FOREIGN PATENT DOCUMENTS

WO    WO 01/045343    6/2001
WO    WO 01/45343 A2    6/2001

(Continued)

OTHER PUBLICATIONS

H. Sugano et al., Presence Information Data Format (PDIF), IETF Instant Messaging and Presence Protocol (IMPP) Working Group, May 2003.

(Continued)

*Primary Examiner* — Duc Nguyen
*Assistant Examiner* — Yosef K Laekemariam
(74) *Attorney, Agent, or Firm* — Buchanan Ingersoll & Rooney PC (57) ABSTRACT

A presence trigger system and a service system support automatic actions on a voice conference based on the presence state of potential conferees of the voice conference. The systems may, for example, initiate contacting and joining the potential conferee to the voice conference when the potential conferee presence state indicates that the potential conferee is available. As another example, the systems may automatically notify participating conferees that the potential conferee has become available. Automatic notification allows participating conferees to concentrate on and contribute to the voice conference without the distraction of frequently checking the presence status of expected, but absent, conferees.

19 Claims, 7 Drawing Sheets

(56) References Cited

U.S. PATENT DOCUMENTS

| | | | |
|---|---|---|---|
| 2004/0122901 A1 | 6/2004 | Sylvain | |
| 2004/0125941 A1 | 7/2004 | Yoakum | |
| 2004/0161080 A1* | 8/2004 | Digate et al. | ............... 379/88.17 |
| 2005/0276397 A1 | 12/2005 | Hiatt et al. | |
| 2007/0192410 A1* | 8/2007 | Liversidge et al. | ........... 709/204 |

FOREIGN PATENT DOCUMENTS

| | | |
|---|---|---|
| WO | WO 03/049459 | 6/2003 |
| WO | WO 2004/114662 | 12/2004 |
| WO | WO 2005/083998 | 9/2005 |

OTHER PUBLICATIONS

J. Peterson, Common Profile for Presence (CPP), IETF Instant Messaging and Presence Protocol (IMPP) Working Group, Aug. 14, 2003.

P. Saint-Andre, Ed., Extensible Messaging and Presence Protocol (XMPP): Core, Jabber Software Foundation, May 6, 2004.

P. Saint-Andre, Mapping the Extensible Messaging and Presence Protocol (XMPP) to Common Presence and Instant Messaging (CPIM), Jabber Software Foundation, May 3, 2004.

P. Saint-Andre, Ed., Extensible Messaging and Presence Protocol (XMPP): Instant Messaging and Presence, Jabber Software Foundatin, Apr. 12, 2004.

M. Day et al., Instant Messaging / Presence Protocol Requirements (Request for Comments: 2779), IETF Instant Messaging and Presence Protocol (IMPP) Working Group, Feb. 2000.

M. Day et al., A model for Presence and Instant Messaging (Request for Comments: 2778), The Internet Society, Feb. 2000.

J. Rosenberg, et al., A Data Format for Presence Using XML, IETF Internet Draft, Jun. 15, 2000.

Rosenberg et al., SIP Extensions for Presence, Internet Engineering Task Force, Jul. 20, 2001.

* cited by examiner

AUTOMATIC VOICE CONFERENCE ACTIONS DRIVEN BY POTENTIAL CONFEREE PRESENCE

FIELD OF THE INVENTION

This invention relates to voice conferencing and presence information and management systems. In particular, this invention relates to automatically taking action on behalf of a voice conference based on potential conferee presence status.

BACKGROUND OF THE INVENTION

Rapid developments in communication technology, driven by strong market demand, have led to sophisticated voice conferencing systems and presence systems. Voice conferencing systems establish, maintain, and terminate voice conferences between multiple conferees. Presence systems track and report whether an individual is on the phone, at their desk, in a meeting, or has another predefined presence state.

In the past, voice conferencing systems and presence systems operated relatively independently. Voice conference participants could determine which potential conferees had actually joined the voice conference by checking a voice conference application, such as a voice conference workgroup portal. However, the voice conference participants had to manually check a different application, such as a personal portal, to determine the presence state of any of their contacts.

When potential conferees were absent from the voice conference, the participating conferees could manually check the presence status of the potential conferees. Manually checking presence status was distracting, unproductive, and time consuming. Moreover, the success of a voice conference often depends on the ability of conferees to communicate their ideas, understand the substantive content of the voice conference, and contribute to the discussion. Accordingly, the success of the voice conference could be compromised not only by the absence of expected participants, but also by the distracting manual investigation into the presence status of the potential conferees.

A need has long existed for enhanced voice conferencing.

SUMMARY

A voice conference service system takes action on behalf of a voice conference based on the presence status of a potential conferee of the voice conference. The service system initially requests a presence trigger system to establish a notification trigger on the potential conferee. The notification trigger determines when the service system should take action. The presence trigger system receives presence updates for the potential conferee from a presence server and responsively determines whether the presence update satisfies the notification trigger. When the presence update satisfies the notification trigger, the presence trigger system initiates an action on behalf of the voice conference by calling the service system to carry out a specified action.

The notification trigger may specify a physical presence state for the potential conferee. Alternatively, the notification trigger may specify a media aggregation state for the potential conferee. As examples, the physical presence state may be 'Available', 'In Office', or 'Working at Home', while the media aggregation state may be 'Office Voice Available' or 'Mobile Voice Available'.

The service system may take a wide range of actions of behalf of the voice conference. As one example, the voice conference action may be to communicate a presence notification to a participating conferee of the voice conference. The presence notification, for example, may inform the participating conferee that the potential conferee is available to join the voice conference. Alternatively or additionally, the voice conference action may be to prompt the voice conference, or specific participating conferees of the voice conference, about whether to add the potential conferee to the voice conference. A participating conferee may then provide a response which, for example, directs the service system to initiate a call to the potential conferee in an attempt to add the potential conferee to the voice conference.

The present invention is defined by the following claims, and nothing in this section should be taken as a limitation on those claims. Further aspects and advantages of the invention are discussed below in conjunction with the preferred embodiments. Any one or more of the above described aspects or aspects described below may be used independently or in combination with other aspects described.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in hardware memories, all or part of systems and methods consistent with the systems may be stored on, distributed across, or read from other machine-readable media, for example, secondary storage devices such as hard disks, floppy disks, and CD-ROMs; other forms of ROM or RAM; transmitted signals; or other machine readable media.

As another example, although specific components and implementations of the processing systems will be described, methods, systems, and articles of manufacture consistent with the processing systems may include additional or different components. For example, a processor may be implemented as a microprocessor, microcontroller, application specific integrated circuit (ASIC), discrete logic, or a combination of other types of circuits or logic. Flags, parameters, identifiers, lists, data, databases, tables, and other data structures may be separately stored and managed, may be stored in a single memory or database, may be distributed, or may be logically and physically organized in many different ways. The programs discussed below may be parts of a single program, may be separate programs, or may be distributed across multiple memories and/or processors. Similarly, the functionality of the systems described below may be implemented in a single processing system or program, or may be distributed among multiple distinct servers, processing systems, programs, or other network entities or agents.

Figure 1:
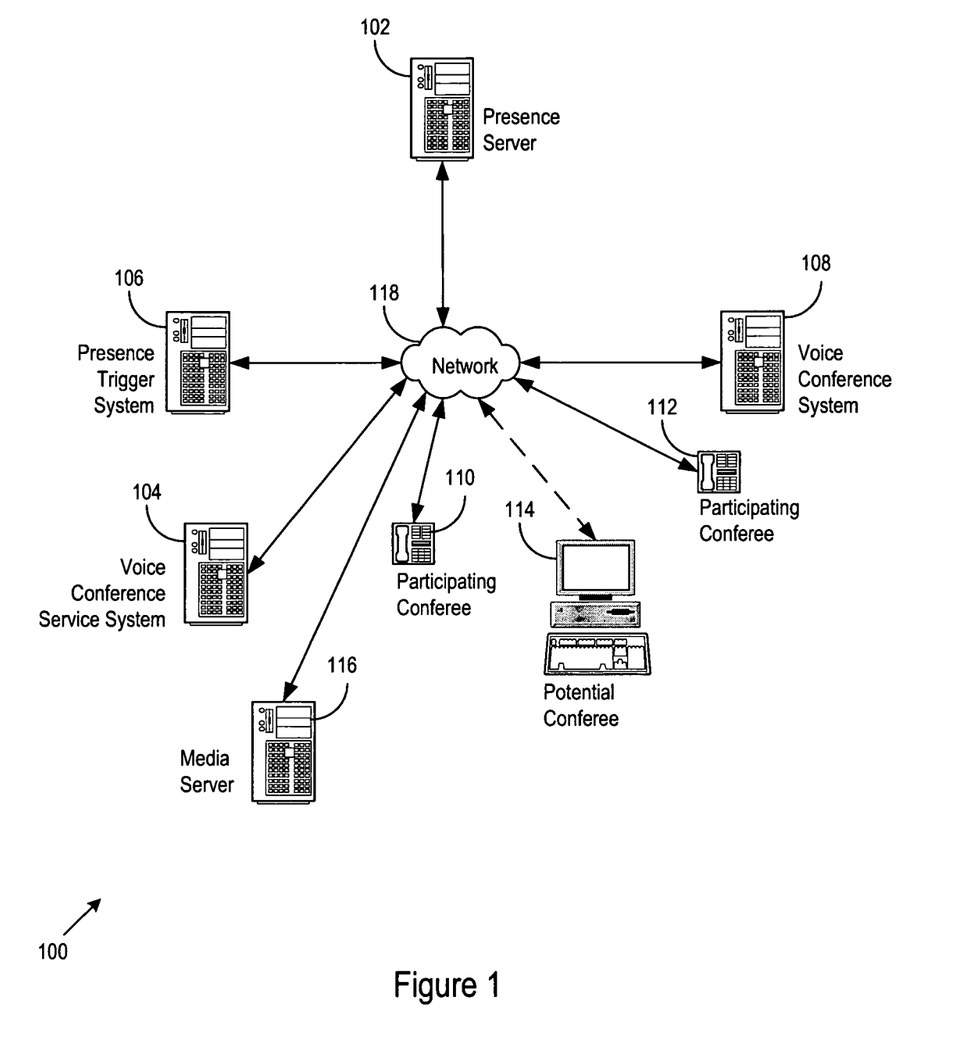
FIG. 1 illustrates a communication network in which a presence trigger system and a voice conference service system interact with a presence server and a voice conference system.

FIG. 1 shows a communication network 100. The entities interacting across the network 100 include a presence server 102, a voice conference service system 104, and a presence trigger system 106. In addition, a voice conference system 108 establishes, maintains, and terminates voice conferences between multiple conferees. FIG. 1 shows two participating conferees 110 and 112 who have joined and who are participating in a voice conference. FIG. 1 also shows a potential conferee 114 who may joint the voice conference, but has not.

A media server 116 is also present in FIG. 1. The media server 116 stores multimedia content such as voice, video, sound or other content. The media server 116 may deliver the content to the voice conference system 104 or conferees 110-114. As will be described in more detail below, the media server 116 may deliver a prompt to the participating conferees 110 and 112 whether to add the potential conferee 114 to the voice conference.

The entities 102-116 communicate with one another over a network or interconnection of networks 118. For example, the entities 102-116 may employ the Real Time Protocol (RTP) over the User Datagram Protocol (UDP), the Transmission Control Protocol/Internet Protocol (TCP/IP) or other network protocols. Signaling between the entities 102-116 may proceed according to the H.323 packet-based multimedia communications system standard, or according to other communication standards. The network 118 may include public and private networks and may deliver data to home or business computers, programs, PDAs, pagers, cell phones, wireline phones, internet phones, or any other communication device, electronic system, or system component, agent, or program.

The entities 102-116 communicating through the network 100 may employ protocols that adhere to any desired specification. For example, the entities may employ the Session Initiation Protocol (SIP) developed for Internet conferencing, telephony, presence, events notification and instant messaging, the Jabber protocol, or SIP for Instant Messaging and Presence Leveraging Extensions (SIMPLE). The form and content of the presence information may be established according to protocols consistent with the Internet Engineering Task Force (IETF) Request for Comments (RFC) 2778 or IETF RFC 2779. Alternatively or additionally, the entities 102-116 may employ extensions to RFC 2778 or RFC 2779, or may employ proprietary protocols.

The conferees in a voice conference may include human beings, electronic devices, computer programs, agents, or other entities. A conferee may be characterized by one or more presence states, such as physical presence states or aggregated media presence states. The physical presence states may be relative to one or more endpoints (e.g., communication devices) to which the conferee has access. Table 1 shows examples of physical presence states and descriptions of the physical presence states.

TABLE 1

Presence States

| Presence State | Description |
| --- | --- |
| 'Available' | The conferee is in the office and available to participate in a voice conference. |
| 'On the Phone' | The conferee is in the office, but is on the phone. |
| 'In Office' | The conferee is in the office. |
| 'Be Right Back' | The conferee is in the office but is not available to participate in a voice conference. |
| 'In Meeting' | The conferee is in the office but is not available to participate in a voice conference because they are in a meeting. |
| 'On Business Trip' | The conferee is not in the office and is not available to participate in a voice conference. |
| 'Out of Office' | The conferee is not in the office and is not available to participate in a voice conference. |
| 'On Vacation' | The conferee is not available to participate in a voice conference. |
| 'No Interruptions' | The conferee is in the office but is not available to participate in a voice conference. |
| 'Working Remotely' | The conferee is working and available to participate in a voice conference, but is not in the office. |
| 'Unknown' | It is not known whether the conferee is available to participate in a voice conference. |

For example, the 'Be Right Back' presence state indicates that the conferee is in the office, but temporarily away from the phone. Different, fewer, or additional presence states may be used. For example, an implementation may use the presence states 'Available', 'Busy', and 'Away'.

The presence states may be applicable to aggregate entities such as workgroups or group phone connections. For example, a presence state may reflect the availability of a group of customer service representatives in a service or support department. When no representative is available to handle the call, the associated presence state may be 'On the Phone'. The presence state may reflect the availability of one or more individual group members, or the group as a whole. Presence states may also be applicable to aggregated media, i.e., a media aggregation state. The media aggregation state may apply to specific types of communication or may apply over a subset of endpoints associated with a conferee. As an example, the media aggregation state may apply to wireless voice communications or wireline voice communication. A conferee who is associated with multiple endpoints (e.g., multiple phone numbers) may have a presence state that aggregates availability over any subset of the endpoints. For example, a conferee with a desk phone and a cell phone may have an aggregated media presence state of 'Voice Busy' when at least one of the phones is in use. As another example, the conferee may have an aggregated media presence state of 'Voice Available' when both phones are not in use.

The entities 102-116 may exchange presence information. For example, the endpoints associated with the conferee 110 may monitor conferee activity and communicate presence updates to the presence server 102. The presence message may indicate, as examples, that the conferee has initiated a phone call, ended a phone call, or started to type an instant message or email message.

The presence information may be communicated in the form of a presence document. In one implementation, the presence document is an extensible markup language (XML) document that identifies a conferee and the presence or availability of the conferee with respect to one or more 'addresses', including endpoints such as telephone numbers, email addresses, instant messaging addresses, or the like. The presence server 102 may aggregate information from one or more of a conferee's endpoints. The presence server 102 may communicate a presence update, including the aggregate presence document in whole or in part, to entities that request (e.g., poll) or subscribe to the presence information for a particular conferee.

As will be explained in more detail below, the presence trigger system 106 maintains a notification trigger for the potential conferee 114. The presence trigger system 106 receives presence updates for the potential conferee 114 from the presence server 102. When the presence update satisfies the notification trigger, the presence trigger system 106 initiates execution of a voice conference action for the voice conference. The presence trigger system 106 may initiate the action by communicating a presence trigger notification to the voice conference service system 104. In turn, the service system 104 may execute any preconfigured action on or with respect to the voice conference, such as sending a presence notification for the potential conferee to one or more of the participating conferees 110 and 112.

Figure 2:
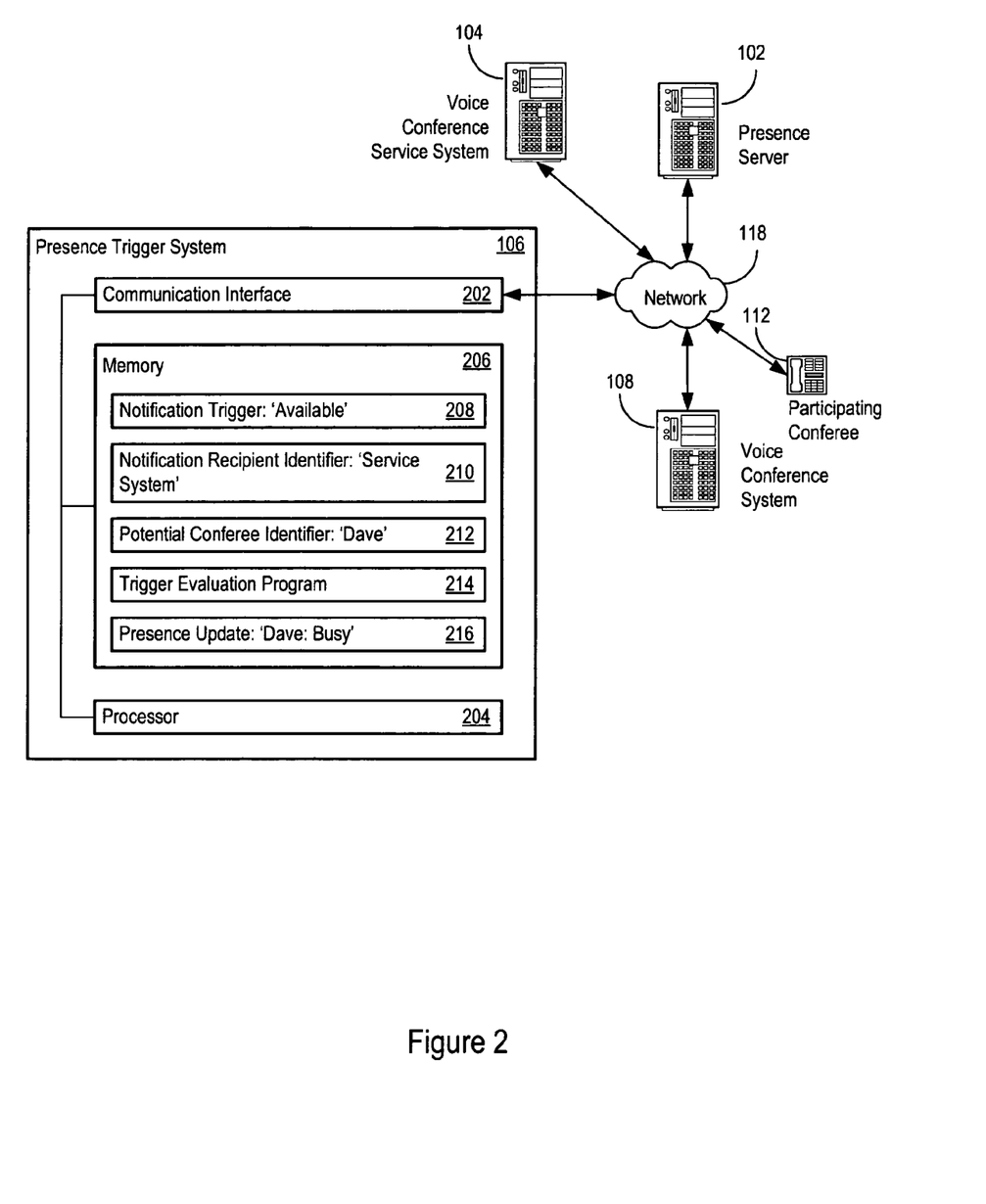
FIG. 2 shows a presence trigger system.

FIG. 2 shows an example of the presence trigger system 106, including a communication interface 202, a processor 204, and a memory 206. The communication interface 202 receives requests to setup notification triggers on potential voice conferees. The requests may include, as examples, the presence state(s) which will give rise to a trigger notification, an identifier (e.g., an IP address, port number, MAC address, or other identifier) of the entity to which to send the notification trigger, and an identification of the potential conferee associated with the notification trigger.

FIG. 2 shows a notification trigger 208 in the memory 206, set to the presence state 'Available'. The notification recipient identifier 210 indicates that the notification trigger will be sent to the service system 104. The potential conferee identifier 212 associates the notification trigger 208 with the individual 'Dave'. A trigger evaluation program 214 in the memory 206 checks the presence update 216 received from the presence server 102 against the notification trigger 208 for the associated conferee. When the presence state conveyed in the presence update 216 satisfies the notification trigger 208, the trigger evaluation program 214 sends a trigger notification to the service system 104. The trigger notification may include an identifier of the potential conferee whose updated presence satisfied the notification trigger 208, a participating conferee identifier (e.g., the voice conference originator), a voice conference identifier (e.g., an identifier of a workgroup which is holding the voice conference), a text message, or other data.

Figure 3:
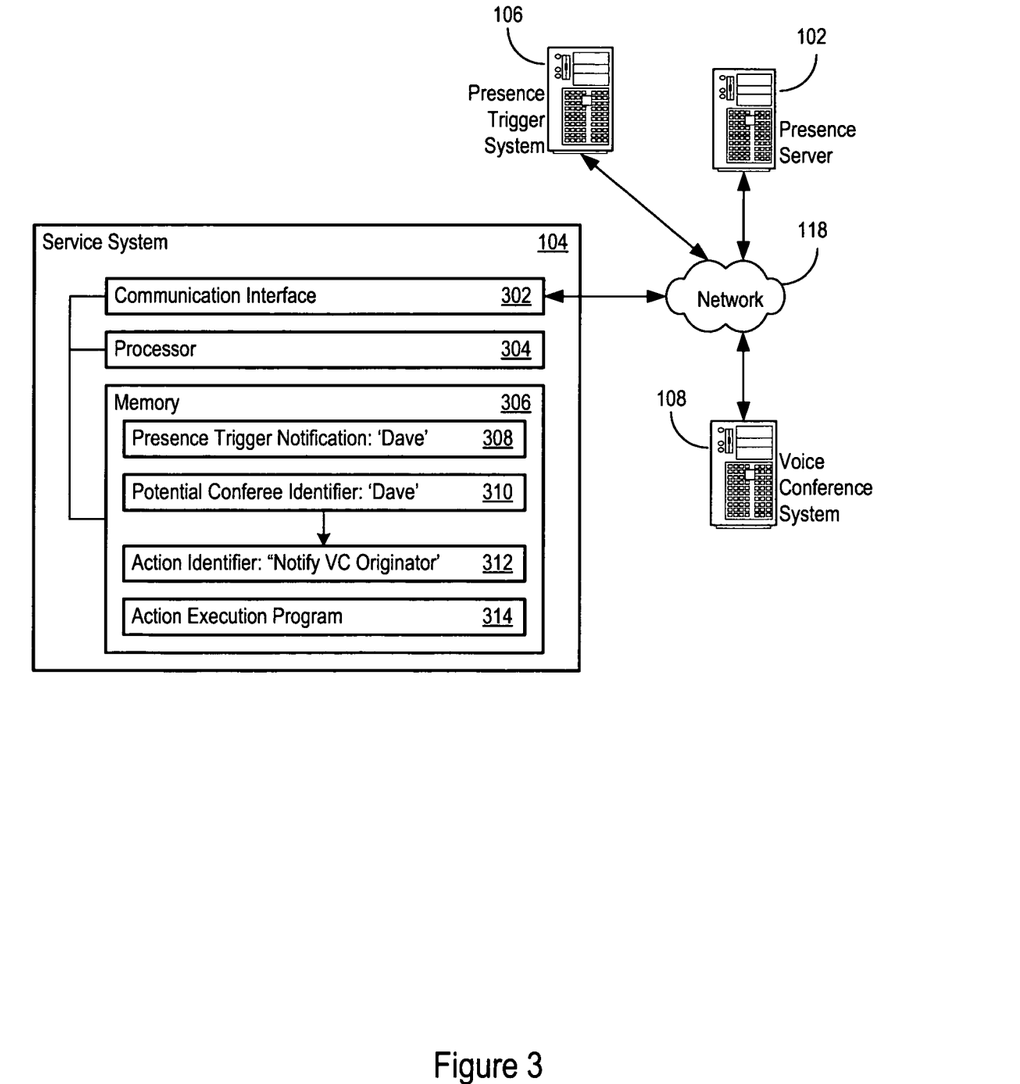
FIG. 3 shows a voice conference service system.

FIG. 3 shows an example of the service system 104. The service system 104 includes a communication interface 302, a processor 304, and a memory 306. The communication interface 302 receives presence trigger notifications 308 (e.g., from the presence trigger system 106) and takes actions on behalf of a voice conference. The memory 306 stores parameters which determine what action to take for any potential conferee who is being watched. To that end, the memory 306 may store and associate a potential conferee identifier 310 with an action identifier 312.

An action execution program 314 handles the presence trigger notifications. In particular, the action execution program 314 examines the trigger notification, determines which potential conferee it matches, and determines (e.g., through the associated action identifier) what action to take. In the example shown in FIG. 3, the service system 104 has received a presence trigger notification on Dave. The action execution program 314 determines, through the action identifier 312 associated with the potential conferee identifier 310, that the action to take is to notify the voice conference originator that Dave is now available to join the voice conference.

Table 2 provides examples of actions which the action execution program 314 may take or may initiate on behalf of a voice conference.

TABLE 2

Actions

| Action | Description |
| --- | --- |
| Notify Participating Conferee | Send an email, IM, voice, or other message to one or more of the participating conferees to provide notice that the potential conferee has a presence state which meets the presence trigger set for the potential conferee. |
| Notify Potential Conferee | Send an email, IM, voice, or other message to the potential conferee to provide notice that the potential conferee's presence is desired in an existing voice conference. |
| Add Potential Conferee to the voice conference | Call the potential conferee and connect the potential conferee to the voice conference. |
| Prompt voice conference whether to add the Potential Conferee | Communicate a prompt to one or more of the participating conferees whether to add the potential conferee. When a participating conferee responds affirmatively, call and connect the potential conferee to the voice conference. |
| Initiate message session with Potential Conferee | Open an IM, voice, or other message session between one or more of the participating conferees and the potential conferee. |

Table 3 provides examples of notification techniques for the participating conferees.

TABLE 3

Notifications

| Notification | Description |
| --- | --- |
| Email Message | Send an email message which notifies the recipient that the potential conferee has a presence state which meets the presence trigger set for the potential conferee. |
| SMS | Send a short message service text message which notifies the recipient that the potential conferee has a presence state which meets the presence trigger set for the potential conferee. |
| Pager | Send an alert to a pager to notify the pager holder that the potential conferee has a presence state which meets the presence trigger set for the potential conferee. |
| IM | Send an instant message which notifies the recipient that the potential conferee has a presence state which meets the presence trigger set for the potential conferee. |
| GUI indicator | Create a notice window, flash an icon, or display or manipulate any other user interface element to provide a notice that the potential conferee has a presence state which meets the presence trigger set for the potential conferee. |
| VC Announcement | Deliver a prompt into the existing voice conference to alert the participating conferees that the potential conferee has a presence state which meets the presence trigger set for the potential conferee. |

Table 4 provides examples of notification techniques for the potential conferee.

TABLE 4

Notifications

| Notification | Description |
| --- | --- |
| Email Message | Send an email message which notifies the potential conferee that an existing voice conference is awaiting their participation. |
| SMS | Send a short message service text message which notifies the potential conferee that an existing voice conference is awaiting their participation. |
| Pager | Send an alert to a pager to notify the potential conferee that an existing voice conference is awaiting their participation. |
| IM | Send an instant message to notify the potential conferee that an existing voice conference is awaiting their participation. |
| GUI indicator | Create a notice window, flash an icon, or display or manipulate any other user interface element to provide a notice to the potential conferee that an existing voice conference is awaiting their participation. |
| Audible Announcement | Call the potential conferee, deliver a voice message to their communication device, or otherwise alert the potential conferee that an existing voice conference is awaiting their participation. |

Any action or notification may be set as a default setting for voice conferences. Alternatively or additionally, a conferee (e.g., the voice conference originator) may establish personal settings which are communicated to the service system 104 or action system 106. The personal settings may override default settings, if any are in place. The settings may be specific to an individual conferee, to a workgroup for which the voice conference is established, or may be specified, set, or determined in other ways based on other factors.

Figure 4:
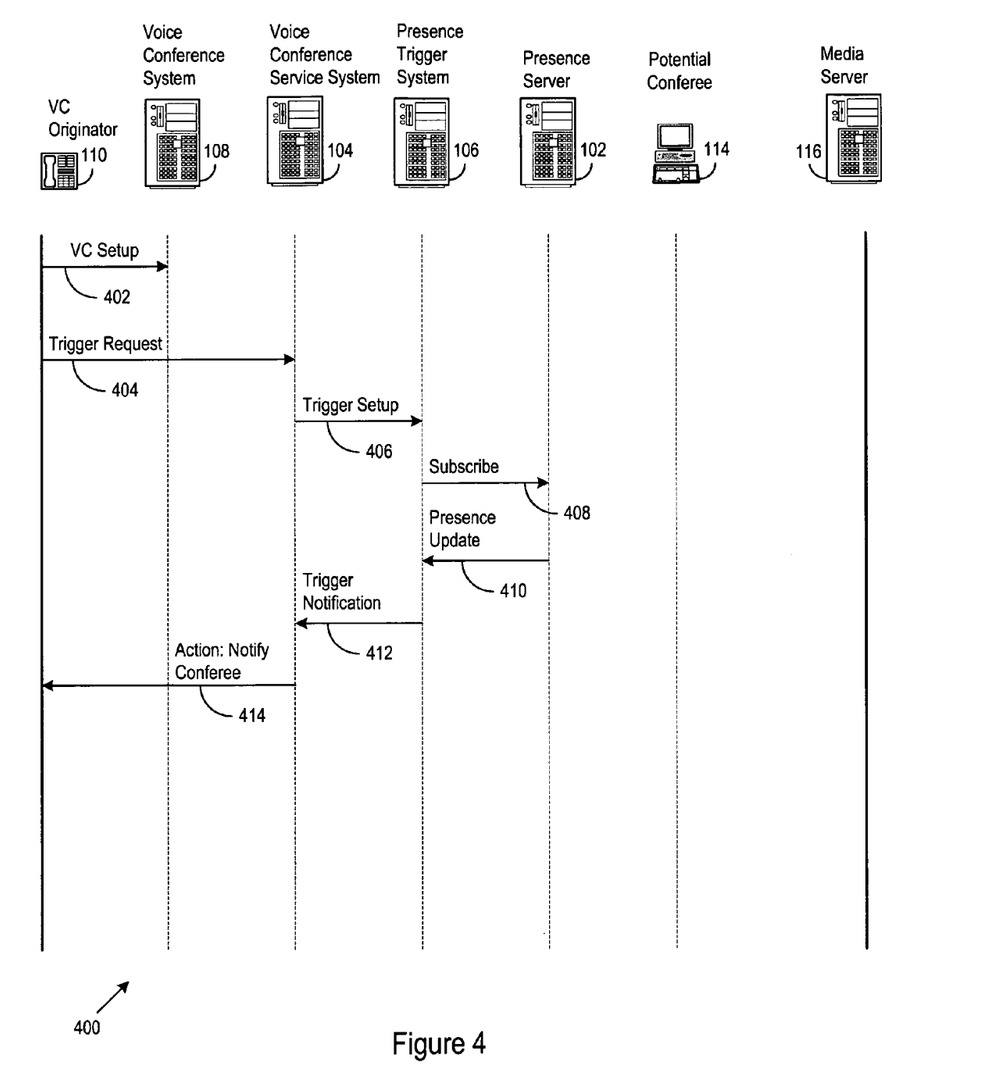
FIG. 4 shows message and information flows between entities in the communication network leading to a participating conferee notification of the availability of a potential conferee.

FIG. 4 shows an example of message flow 400 in the network 100. In particular, the voice conference originator (e.g., the participating conferee 110) initiates a voice conference, resulting in a voice conference setup message 402 to the voice conference system 108. In addition, the participating conferee 110 (or the voice conference system 108) sends a trigger request message 404 to the voice conference service system 104. The trigger request message 404 may specify the potential conferee to monitor, the presence states on which to trigger a presence notification, the entity to notify with the presence notification, an action to take when the presence state is satisfied, the preferred type of notification, or other information.

The voice conference service system 104 receives the trigger request message 404 and sends a trigger setup message 406 to the presence trigger system 106. The presence trigger system 106 responsively establishes a new notification trigger in memory. The presence trigger system 106 may then send a subscription message 408 to the presence server 102 for presence updates for the potential conferee.

The presence server 102 provides presence update messages 410 to the presence trigger system 106. When the presence state communicated in the presence update message satisfies the notification trigger, the presence trigger system 106 sends a trigger notification 412 to the voice conference service system 104. In the example shown in FIG. 4, the voice conference service system 104 takes the action of sending a notification 414 (e.g., a presence notification) the participating conferee 110 that the potential conferee has met the specified presence trigger and, for example, is available to join the voice conference.

Figure 5:
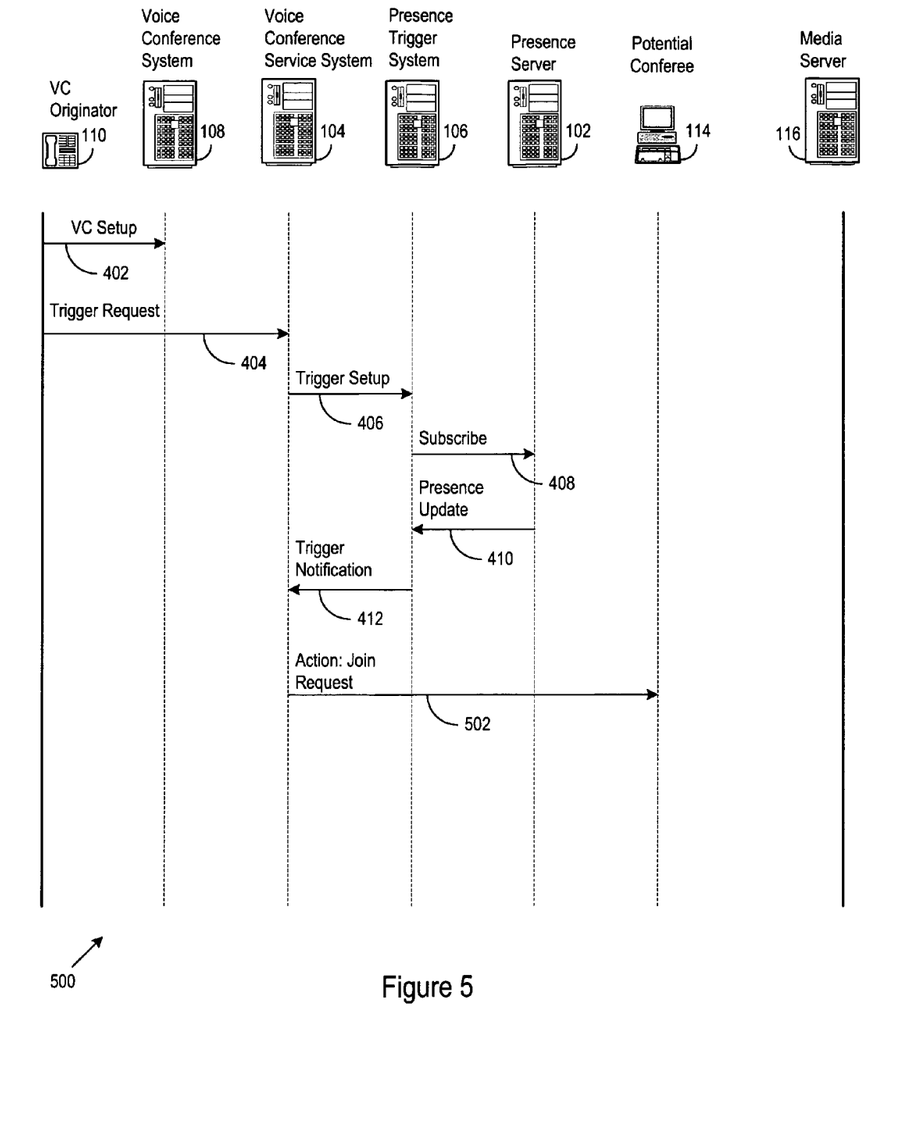
FIG. 5 shows message and information flows between entities in the communication network leading to a join request communicated to a potential conferee of a voice conference.

FIG. 5 shows a second example of message flow 500 in the network 100. In this example, however, the service system 104 takes the action of communicating a join request 502 to the potential conferee 114. The join request may take the form of an email message, instant message, or other message to the potential conferee 114. Alternatively or additionally, the join request 502 may include placing a call to the potential conferee 114, prompting the potential conferee 114 whether to join the voice conference, and automatically joining the potential conferee 114 to the voice conference.

Figure 6:
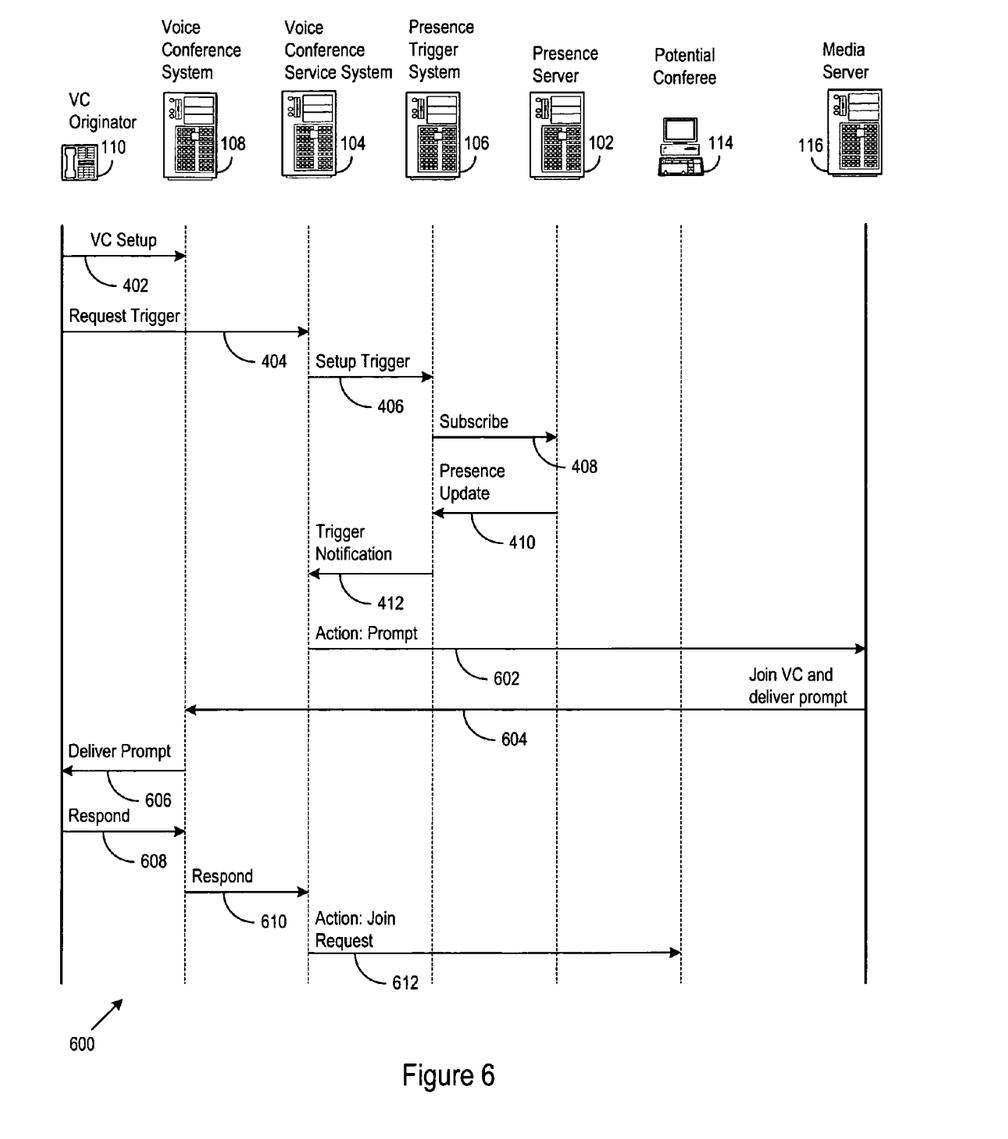
FIG. 6 shows message and information flows between entities in the communication network leading to a prompt to a participating conferee of whether to join a potential conferee to a voice conference.

A third example of message flow 600, shown in FIG. 6, includes interaction with the media server 116. The service system 104 takes the action of prompting the participating conferee 110 about whether to add the potential conferee 114. To that end, the service system 104 may send a prompt request message 602 to the media server 116.

The media server 116 then joins the voice conference and delivers the prompt 604 to the voice conference system 108. The voice conference system 108 communicates the prompt 606 to one or more of the participating conferees 110 and 112. The participating conferees 110 and 112 may provide a response 608 through a voice command, DTMF tones, or other mechanism to the voice conference system 108. The voice conference system 108 may then provide a response 610 to the service system 104. Depending on whether the participating conferees 110 and 112 have chosen to add the potential conferee 114, the service system 104 may proceed with a join request 612 to the potential conferee 114.

Figure 7:
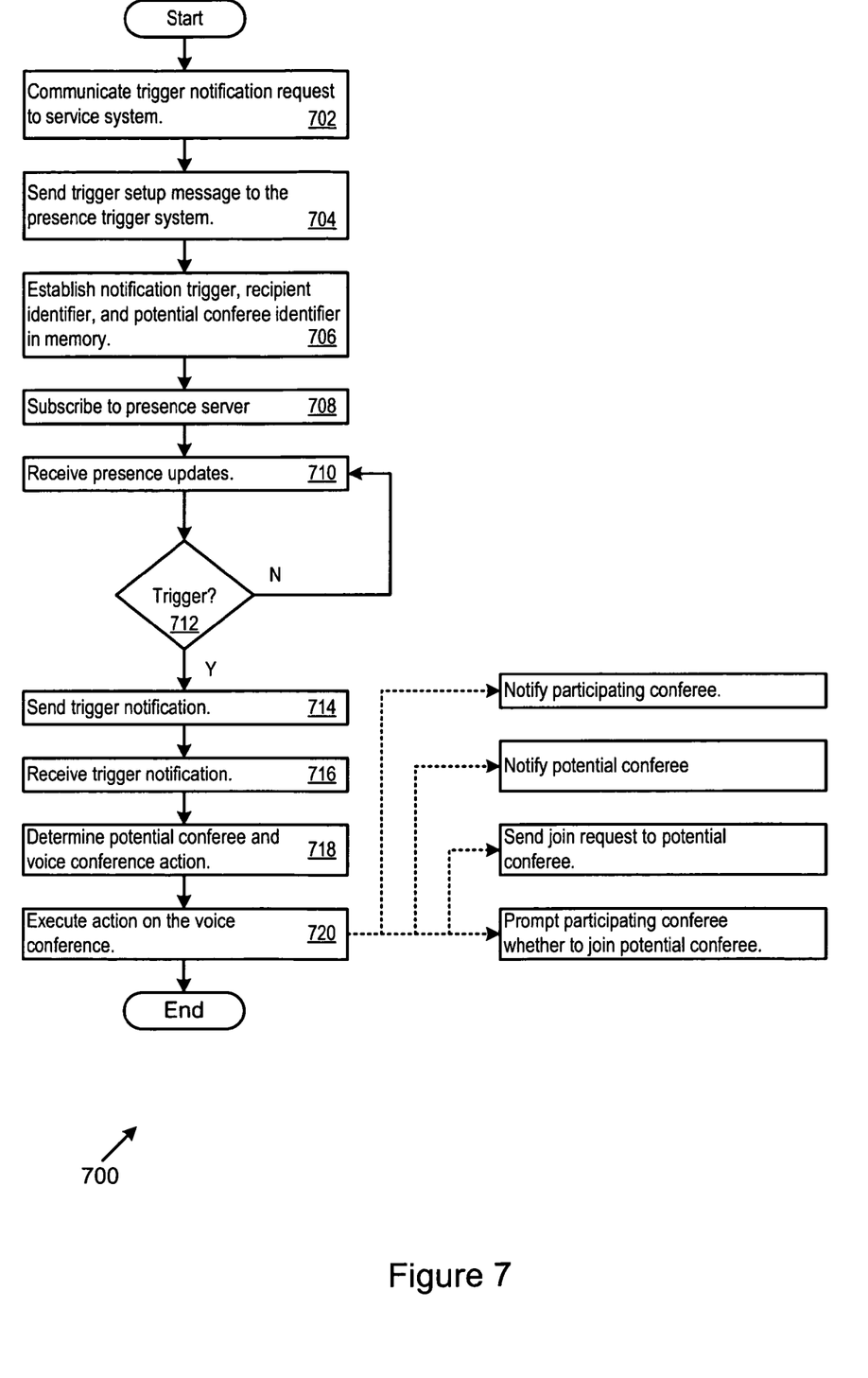
FIG. 7 shows a flow diagram of the processing which the entities in the communication network may perform to take actions on voice conferences in response to presence triggers.

FIG. 7 shows a flow diagram 700 of the acts taken by the systems and programs described above. A participating conferee (e.g., the voice conference originator) or the voice conference system 108 may communicate a trigger notification request to the voice conference service system 104 (Act 702). The service system 104 sends a trigger setup message to the presence trigger system 106 (Act 704). Thus, the service system 104 and presence trigger system 106 will monitor the presence of potential conferees of the voice conference on behalf of the participating conferee and voice conference.

Upon receiving the trigger setup message, the presence trigger system 106 establishes a notification trigger 208, notification recipient identifier 210, and potential conferee identifier 212 (Act 706). The presence trigger system 106 subscribes to presence updates for the potential conferee with the presence system 102 (Act 708). Presence updates arrive at the presence trigger system (Act 710).

The trigger evaluation program 214 determines whether the presence state delivered in a presence update satisfies the notification trigger 208 (Act 712). If so, the presence trigger system 106 sends a trigger notification (Act 714). The trigger notification may include an identifier of the potential conferee whose presence changed, an identifier of a participating conferee (e.g., the voice conference originator), a voice conference identifier (e.g., an identifier of a workgroup which is holding the voice conference), a text message, or any other desired data.

The trigger notification arrives at the specified recipient for the notification trigger, such as the service system 104 (Act 716). The action execution program 314 in the system 104 determines the potential conferee and the associated action to take (Act 718). Once the action is determined, the action execution program 314 executes the action on behalf of the voice conference (Act 720), such as notifying a participating conferee or the potential conferee, sending a join request to the potential conferee, or prompting a participating conferee whether to join the potential conferee.

The actions taken automatically on behalf of the voice conference allow participating conferees to listen, understand, and contribute to the content of the voice conference. The participating conferees are not distracted by frequently checking the presence status of expected, but absent, conferees. The actions may include automatic voice conference notification of potential conferee availability, automatically contacting and joining the potential conferee to the voice conference, or other actions.

It is therefore intended that the foregoing detailed description be regarded as illustrative rather than limiting, and that it be understood that it is the following claims, including all equivalents, that are intended to define the spirit and scope of this invention.

The invention claimed is:

1. A method of conducting a voice conference via a voice conferencing system, the method comprising:
   defining a notification trigger on an availability status for a potential conference participant of an ongoing voice conference, the notification trigger identifying at least one of a physical presence state and a media aggregation state for the potential conference participant;
   receiving a presence state associated with the potential conference participant;
   determining whether the presence state associated with the potential conference participant satisfies the defined notification trigger;
   executing a voice conference action to send a message to the potential conference participant to join the potential conference participant to the ongoing voice conference when the presence state satisfies the defined notification trigger, wherein the voice conference action comprises delivery of a prompt to a conference participant of the voice conference that requests approval of the conference participant to join the potential conference participant to the voice conference.

2. The method of claim 1 wherein the prompt is delivered from a multimedia server to at least one conference participant of the voice conference to join the potential conference participant into the voice conference and wherein the notification trigger is defined by one of the at least one conference participant.

3. The method of claim 1 further comprising:
   connecting the potential conference participant to the voice conference, wherein the ongoing voice conference comprises an established voice conference between at least one first conference participant and a second conference participant.

4. The method of claim 3, wherein connecting the potential conference participant comprises:
   communicating a join request to the potential conference participant.

5. The method of claim 1 further comprising:
   receiving an affirmative response to the prompt and responsively attempting to add the potential conference participant into the voice conference.

6. The method of claim 1 wherein delivering the prompt comprises:
   communicating a request to join the potential conference participant to the media server and the media server delivering the prompt to the voice conference.

7. The method of claim 1, wherein the notification trigger identifies both the media aggregation state and the physical presence state needed for the potential conference participant to be available for the voice conference.

8. The method of claim 1, wherein executing the voice conference action comprises:
   delivering stored multimedia content from a multimedia server to the at least one potential conference participant of the voice conference.

9. A voice conferencing system comprising:
   a presence trigger system in communication with at least one of a voice conference system, a presence server and a media server, the presence trigger system having non-transitory memory comprising:
   a notification trigger for an availability status for a potential conference participant of an ongoing voice conference, the notification trigger identifying at least one of a physical presence state and a media aggregation state for the potential conference participant to the ongoing voice conference; and
   the memory also having instructions for evaluating when the notification trigger has been met that define a method the presence trigger system performs when the instructions are processed, the method comprising:
   receiving a presence state associated with the potential conference participant,
   determining whether the presence state associated with the potential conference participant satisfies the notification trigger, and
   initiating execution of a voice conference action attempting to join the potential conference participant to the ongoing voice conference when the received presence state satisfies the defined notification trigger, wherein the voice conference action comprises delivery of a prompt to a conference participant of the voice conference that requests approval of the conference participant to join the potential conference participant to the voice conference; and
   a processor coupled to the memory that executes the instructions.

10. The voice conferencing system of claim 9, wherein the method defined by the instructions of the memory of the presence trigger system also comprise:
    receiving a notification request from a notification requester; and
    associating a notification recipient identifier for the notification requester with the notification trigger.

11. The voice conferencing system of claim 10 wherein the method defined by the instructions of the memory of the presence trigger system also comprises receiving the notification trigger from the notification requester, the received notification trigger defining the notification trigger stored in the memory.

12. The voice conferencing system of claim 9, wherein the notification trigger identifies both the media aggregation state and the physical presence state needed for the potential conference participant to be available for the voice conference.

13. The voice conferencing system of claim 9, wherein the execution of a the voice conference action comprises sending a presence notification to a conference participant of the voice conference.

14. The voice conferencing system of claim 9, wherein the execution of the voice conference action comprises communicating an invitation to join the voice conference to the potential conference participant.

15. The voice conferencing system of claim 9 wherein the presence state associated with the potential conference participant is an aggregated presence state.

16. The method of claim 2 wherein delivering the prompt comprises:
    communicating a presence notification to the at least one conference participant.

17. The method of claim 1 wherein the presence state associated with the potential conference participant is an aggregated presence state.

18. A method for managing an ongoing voice conference, comprising:
    establishing a notification trigger via a voice conference system during an ongoing voice conference, the notification trigger having at least one specified presence state for at least one potential conference participant, the notification trigger being defined by a conference participant of the ongoing voice conference and being stored in a non-transitory computer readable medium of the voice conference system, the at least one specified presence state comprising at least one of a media aggregation state and a physical presence state for the at least one potential conference participant;

receiving a presence update message associated with the at least one potential conference participant;

comparing the at least one specified presence state of the notification trigger with the presence update message associated with the at least one potential conference participant; and initiating execution of a voice conference action attempting to join the potential conference participant to the ongoing voice conference when the received presence state satisfies the defined notification trigger, wherein the voice conference action comprises delivery of a prompt to a conference participant of the voice conference that requests approval of the conference participant to join the potential conference participant to the voice conference;

communicating a join request to at least one of the at least one potential conference participant automatically in response to the at least one specified presence state of the notification trigger matching a presence state of the presence update message associated with the at least one potential conference participant and receipt of the approval from the conference participant, the join request requesting the at least one potential conference participant to join the ongoing voice conference.

19. The method of claim 18 wherein the at least one specified presence state of the notification trigger comprises both the physical presence state for the at least one potential conference participant and the media aggregation state for the at least one potential conference participant.

* * * * *